United States Patent [19]
Graham

[11] Patent Number: 6,070,758
[45] Date of Patent: Jun. 6, 2000

[54] AUTOMATIC SCREW FEEDING MACHINE MANIFOLD AND ARRANGEMENT THEREFOR

[75] Inventor: Brian Graham, Boynton Beach, Fla.

[73] Assignee: Nasco Industries, Inc., Ft. Lauderdale, Fla.

[21] Appl. No.: 09/121,697

[22] Filed: Jul. 24, 1998

[51] Int. Cl.[7] .................................................. B65G 59/00
[52] U.S. Cl. ............................ 221/183; 221/278; 406/72
[58] Field of Search ............................ 221/172, 183, 221/278; 406/72

[56] References Cited

U.S. PATENT DOCUMENTS

| | | |
|---|---|---|
| 4,101,054 | 7/1978 | Frost et al. ............................ 221/278 |
| 4,114,663 | 9/1978 | Viner ................................. 221/278 X |
| 4,208,153 | 6/1980 | Trethewy ............................ 221/278 X |
| 4,694,974 | 9/1987 | Heck et al. ......................... 221/278 X |
| 4,732,296 | 3/1988 | Heck et al. ......................... 221/278 X |
| 5,280,857 | 1/1994 | Reichner ................................. 241/5 |

*Primary Examiner*—Christopher P. Ellis
*Assistant Examiner*—Gene O. Crawford
*Attorney, Agent, or Firm*—R. M. Saccoccio

[57] ABSTRACT

An arrangement (10) and a manifold (12) are disclosed for feeding different sized or types of fasteners from a plurality of automatic screw feeding machines (11) into and through the manifold (12) to a fastening tool (21) at a remote location, whereby one fastener is output from the automatic screw feeding machines (11) and delivered to the remote location before another fastener is output from one of the screw feeding machines (11).

15 Claims, 4 Drawing Sheets

AUTOMATIC SCREW FEEDING MACHINE MANIFOLD AND ARRANGEMENT THEREFOR

BACKGROUND OF THE INVENTION

1. Field of the Invention

This invention relates generally to the field of automatic screw-feed machines and in particular to methods and apparatus for utilizing a plurality of screw-feed machines to feed a single outlet.

2. Description of the Prior Art

In general, automatic screw-feed machines serve the function of delivering a single screw, rivet, pin, or other like fastener to a work site which is remote from a container having a plurality of such fasteners contained therewithin. Automatic screw-feed machines are used in manufacturing where a large number of fasteners are to be applied to the products being assembled or joined. They are mass-production devices which avoid having a worker hand select a fastener from a container and then apply the fastener to the work.

In accordance with the above, a typical prior art automatic screw feed machine comprises a storage container which usually rotates to feed fasteners in a preferred orientation relative to a track arrangement. The track arrangement delivers the aligned fasteners to an escape mechanism which further orients a single fastener and feeds the fastener into a tube. Air power is then used to drive the fastener along the length of the tube to an outlet. An air-operated tool such as a screw driver or riveting machine might be connected to the outlet so that the worker can position the fastener to its assigned location on the work piece and apply the fastener or rivet it in place.

Of course, automatic screw-feed machines must be free of any malfunctions which cause jamming of the fasteners anywhere along their path from the storage bin to the tool at the location where the fastener is to be used. Nasco Ind., Inc. by and through its employees has invented and patented a number of improvements to automatic screw-feed machines which have, over the years, demonstrated their effectiveness in preventing malfunctions, speed up production, and substantially benefit the worker by improved ergonomics. U.S. Pat. No. 4,671,143, "Driver Jaws for an Automatic Screw Feeding Machine," is one such invention which utilizes cantilever springs to hold and position a fastener during assembly. U.S. Pat. No. 4,694,974, "Escapement Apparatus for an Automatic Screw Feeding Machine," is another invention of Nasco Ind., Inc. which smoothly removes a single fastener from a track, orients it, and then inserts the fastener into the tube which leads to the driver jaws. "Track Feed Arrangement for an Automatic Screw Feeding Machine," U.S. Pat. No. 4,732,296 is yet another invention of Nasco which provides for efficient and non-malfunctioning of the movement of fasteners from a storage bin to an escapement mechanism. An even further contribution of Nasco is disclosed in U.S. Pat. No. 5,234,127, "Pneumatic Automatic Fastener Feeder." In this invention, up-and-down pivoting motion of the track provides for removing fasteners from the storage bin and delivering the same to the escapement mechanism. In the trade, this invention is characteristically referred to as a 'woodpecker' machine because of the similarity of the up-and-down movement of the track to the head of a woodpecker. A large number of automatic screw-feeding machines are in use today which utilize the inventions of Nasco and serve as a testimonial to the effectiveness of its innovations in the industry.

Aircraft manufacturing facilities use a substantial number of automatic screw-feeding machines to assembly commercial and military aircraft, both large and small. In this industry, the screw-feeding machines deliver rivets to a rivet gun which a worker uses to rivet the metal components forming the wings and body of the aircraft to the underlying support members and/or to fasten wing and body sections to each other. Typically, assembly of a single aircraft involves the use of a large number of different sized rivets. The size differences include both diameter and length depending upon the location where the rivets are to be used on the aircraft. For example, the diameter of the rivets used to fabricate a wing continually change from large rivets used near the body of the plane to smaller and smaller rivets as the tip of the wing is approached. In view of the sheer number of rivets used to assembly an aircraft in conjunction with the different rivet sizes, it is readily understood that a large number of automatic screw-feeding machines are necessary in aircraft construction.

The physical space required to house the large numbers of automatic screw-feeding machines used in aircraft construction presents a formidable problem in and of itself. The space required by the screw-feeding machines take up space around the aircraft during construction. Workers must continually work around the presence of the machines. Clutter is created which leads to inefficiency. The large number of feed tubes from the machines to the worker also create efficiency and clutter problems. The workers must continually change to different feed tubes to be able to apply the properly-sized rivers. A better system would be most advantageous.

Accordingly, a major objective of the present invention is to significantly reduce the clutter around the work space of an aircraft during construction and allow for more efficient fabrication of aircraft wings and bodies.

Another object of the present invention is to provide a manifold for use with a plurality of automatic screw feed machines and to provide a single feed tube to a riveting tool whereby a plurality of different sized rivets or fasteners are capable of being feed from the automatic screw feed machines to the riveting tool at the selection of the operator.

SUMMARY OF THE INVENTION

The present invention accomplishes the above-stated objectives as well as others, although not specifically stated herein but as may be determined by a fair reading and interpretation of the entire specification herein. In one preferred embodiment of the present inventon, an arrangement of automatic screw-feed machines is presented with each automatic screw-feeding machine delivering a different sized fastener to a manifold. The manifold includes a plurality of entrance ports connected to a common internal axial flow path. A single outlet port from the manifold is connected to a single delivery tube which feeds one of the fasteners from one of the screw-feed machines to a tool for applying the fastener. The entrance ports of the manifold are positioned at an angle to the axial centerline to provide for re-orienting the position of a fastener from the tube feeding the fastener to the manifold to the axial flow path within the manifold. Controls are provided to change from one screw-feed machine to another.

The manifold provided by the present invention, in one embodiment thereof, is a two-piece member wherein the manifold is divided along the axial length thereof The two-piece feature provides for quick disassembly so that a jam within the manifold can be quickly cleared. Two or more manifolds can be axially joined to create a longer manifold which accommodates a larger number of different sized fasteners.

The above-stated objects as well as other objects which, although not specifically stated, but are intended to be included within the scope of the present invention, are accomplished by the present invention and will become apparent from the hereinafter set forth Detailed Description of the Invention, Drawings, and the claims appended herewith.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

Figure 1:
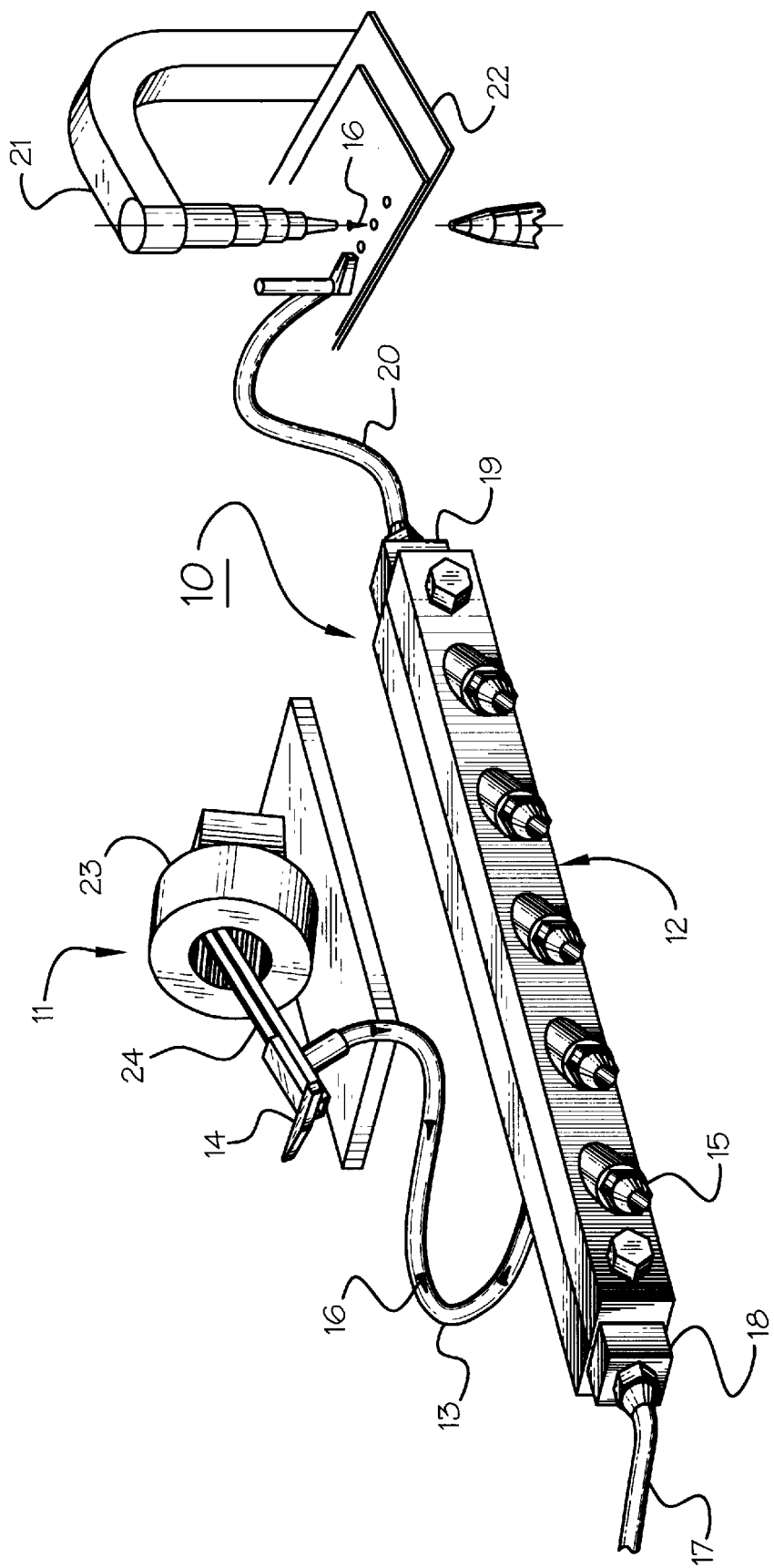
FIG. 1 is an isometric rendering of the arrangement of the components of the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

FIG. 1 schematically illustrates the arrangement 10 of various components of the present invention. A single automatic screw-feed machine 11 is shown; however, it is to be understood that a plurality of such machines 11 are to be used with the present invention with each screw-feed machine 11 containing a different sized fastener. A manifold 12 is connected to each of the screw-feed machines 11 by a blow feed tube 13. Blow feed tube 13 extends from the escapement mechanism 14 of the screw-feed machine to a single inlet port 15 of manifold 12. It is to be observed that each inlet port 15 is at all angle to the axial centerline of manifold 12. Such angling provides for one aspect of reorienting a fastener 16 from its position within blow feed tube 13 at inlet port 15 to an axial orientation within a flow path 26 (see FIG. 5) within manifold 12.

An air blow tube 17 is connected to the axial flow path 26 of manifold 12 at one end 18 of manifold 12. air blow tube 17 is connected to a pressurized air source (not shown) which is used to move a single fastener from an inlet port 15 to an exit port 19 of manifold 12. Outlet port 19 comprises a single port at an end of the manifold 12 opposite to the inlet end 18 of manifold 12. The invention allows for a single outlet port 19 regardless of the different sizes of the fasteners.

A single blow delivery tube 20 directs a fastener from the manifold 12 to a fastening tool 21. The fastening tool 21 is typically located at the place that a fastener is to be applied to a work piece 22. The fastening tool 21 is, of course, used to attach a fastener to the work piece. The present invention anticipates that any prior art fastening tool 21 may be used. It may be a screw driver, a riveting machine, or any other machine adapted to apply a fastener such that two or more pieces are joined together.

In operation, the arrangement provided by the present invention selects a particular sized fastener from one of the screw-feed machines 11. Appropriate prior art controls are used to select and change the screw-feed machine having the proper sized fastener that a worker intends to use at any particular time. The fastener 16 travels from the container 23 to the track 24, to the escapement mechanism 14 of a screw-feed machine 11 where it is fed into the blow feed tube 13 connecting the particular screw-feed machine 11 to an inlet port 15 of the manifold 12. The screw-feed machine 11 provides for the proper orientation of the head of the fastener 16 within the blow feed tube 13. Upon entering an inlet port 15, the fastener continues its movement in a path as directed by the angle of the inlet port 15. Since the inlet port 15 is connected to the axial flow path 26 within manifold 12, the fastener is caused to enter the axial flow path 26 while maintaining the previously established orientation of the head of the fastener 16. The fastener 16 then orients itself to the flow path 26 described by the axial channel within manifold 12 but with the head still oriented as previously. The pressurized air within air air blow tube 17 propels the fastener through and out of the manifold 12 and into the blow delivery tube 20. Upon exiting from blow delivery tube 20, the fastener 16 is applied to the work piece 22 by the fastener tool 21.

Figure 2:
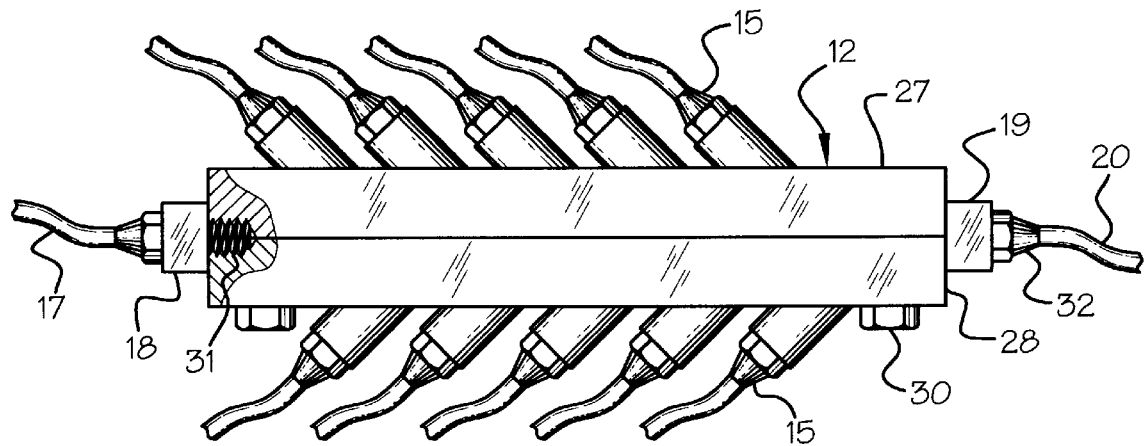
FIG. 2 is a top plan view of a manifold having entrance ports on two sides of the manifold.
Figure 4:
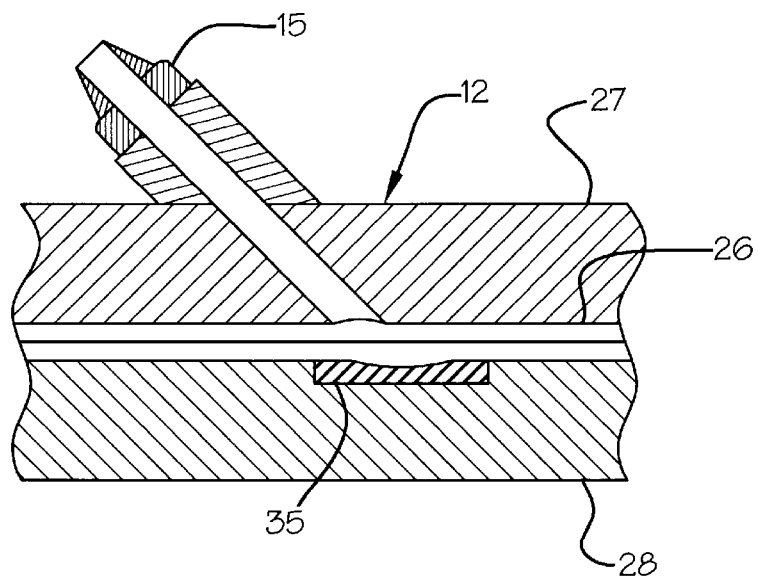
FIG. 4 is an enlarged, partial cross-sectional view of the manifold of FIG. 2 taken along the line 4—4 thereof.

FIGS. 2 and 4 show a manifold 12 having inlet ports 15 on two opposite sides 27 and 28 thereof The opposite sides 27 and 28 are mirror images of each ol her but offset such that each inlet port 15 is positioned between the space 29 between two inlet ports 15 on the opposite side. The offset feature is necessary in order to properly direct the flow path of a fastener 16 from that of an inlet port 15 to that of the axial flow channel 26 within manifold 12. In the embodiment of FIGS. 2 and 4, each manifold half 27 and 28 is machined to comprise one axial half of channel 26 and one axial half of inlet 18 and outlet 19. A plurality of bolts 30 or other appropriate type of fastener is used to joint manifold halves 27 and 28.

According to the present invention, inlet port 18 and outlet port 19 are threaded 31 to manifold 12 and such that a connector 32 interfaces between the tubes 17 and 20 and ports 18 and 19, respectively. Connector 32 comprises a means to connect flow tubes 17 and 20 to the body of manifold 12 at their appropriate locations. Accordingly, connector 32 can consist of, for example, a compression fitting which is threaded into the ports 18 and 19, or a hose clamp. A similar type of connection may be used to attach flow tubes 16 to inlet ports 15.

Figure 3:
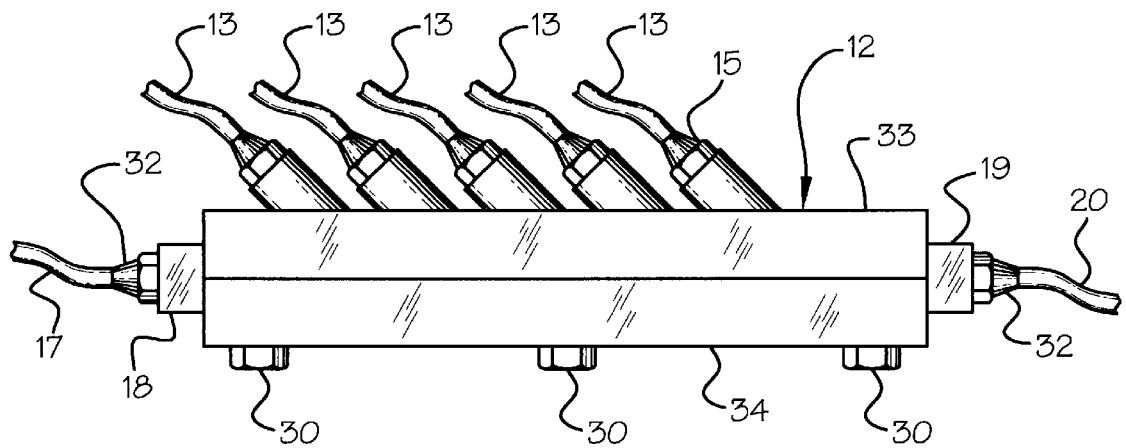
FIG. 3 is a top plan view of a manifold having entrance ports on one side of the manifold.
Figure 5:
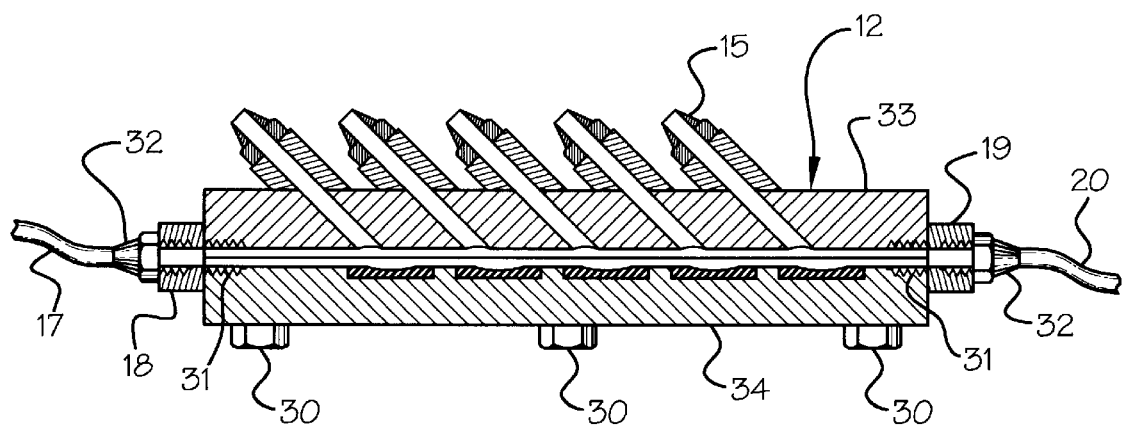
FIG. 5 is a cross-sectional view of the manifold of FIG. 3 taken along the line 5—5 thereof.

The embodiment of FIGS. 3 and 5 illustrate a manifold 12 having, a plurality of inlet ports 15 only on one side thereof. In this embodiment, the manifold is again divided axially into two components, each having one half of the axial flow channel there through and joined together by a plurality of bolts 30. Side 34 of manifold 12 does not contain inlet ports 15. This embodiment then does not require the spaces 29 between inlet ports 15 of the embodiment of FIGS. 2 and 4. The manifold 12 allows for side-by-side placement of a plurality of manifolds 33 each of which may be connected to the same flat surface such that a bank of manifolds 33 may be created at one or more horizontal levels. Moreover, this arrangement would not require any significant amount of space between the side-by-side manifolds 33 and results in an extremely effective space-saving arrangement. This arrangement is schematically shown in FIG. 6.

FIGS. 4 and 5 also illustrate the use of an impact member 35, a plurality of which are located within the axial flow channel 26 at a position opposite from the inlet ports 15. Each impact member 35 is made from a hardened material sufficient to absorb the impact of a fastener as it forcefully exits from an inlet port 15 to within the axial flown channel 26. The hardness of impact member 35 will have little effect on each fastener 16 because each fastener will experience only one impact. Impact members 35 on the other hand, will experience many impacts from the many fasteners 16 which will exit inlet ports 15; thus, appropriate hardness is required to avoid denting of the impact members 35 and, therefore, to avoid disturbing the change of direction of travel of the fastener from the path of the inlet port 15 to the path of the flow channel 26. The curved shape of impact members 35 facilitate the redirection of the travel path of the fasteners 16 from the line of the inlet ports 15 to the line 26 of the manifold 12. While the angularity of the inlet ports 15 relative to the axial center of the manifolds 12 and 33 helps reduce the force of the impact and helps in redirecting the travel of the fasteners 16, the assistance further in this regard provided by the impact member 35 has been found to be most beneficial. Attachment of the impact members 35 to the manifold 12 may be accomplished in any convenient prior art manner; for example, by screws, which provide for removability and replacement of a damaged impact member, or by welding or apress fit, which provides for a secure means of attachment of an impact member but one that is not readily replaceable.

Figure 6:
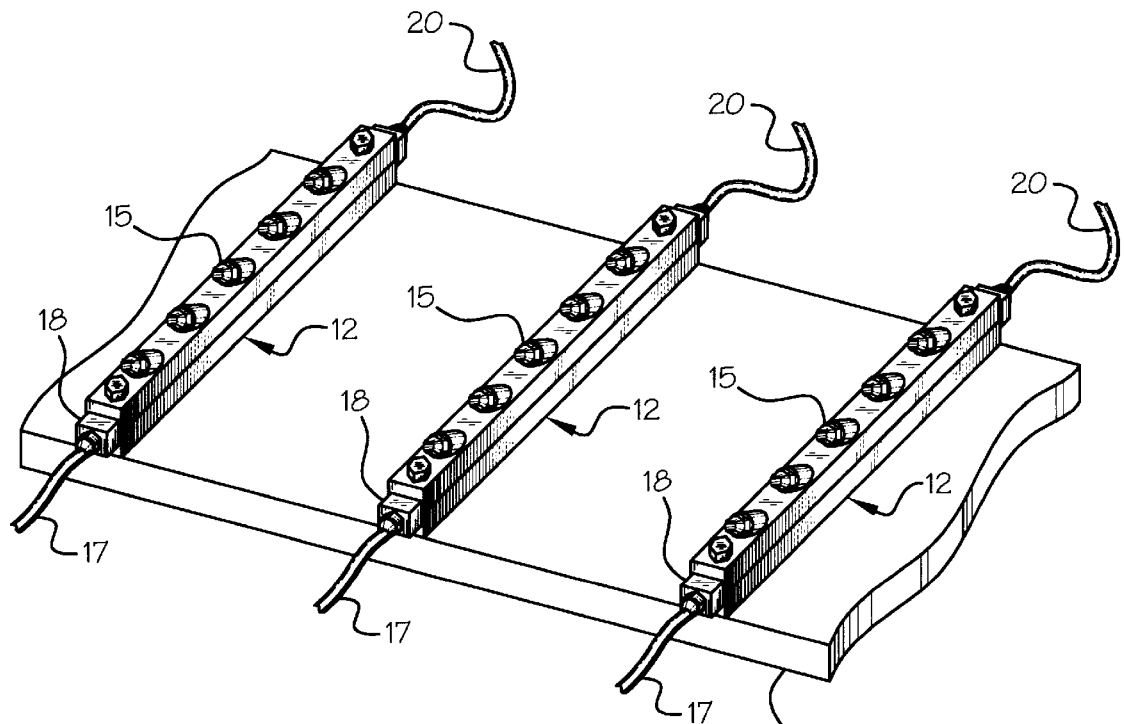
FIG. 6 is a schematic view of one arrangement of ganged marigolds according to the present invention: and, FIG. 7 is a schematic view of one arrangement of tandem manifolds according to the present invention.

FIG. 6 illustrates one arrangement of a plurality of ganged manifolds 12, which are shown side by side and attached to a table or a platform 36. In this arrangement, each of a plurality of screw feed machines 11 are attached by their blow feed tube 13 to each inlet port of each manifold 12. Each of the blow delivery tubes 20 may theft be attached to a respective fastening tool 21; or, in the alternative the blow delivery tubes 20 may be attached to yet another manifold 12 which is then attached to a single fastening tool 21. While the manifolds 12 shown in FIG. 6 are of the type having inlet ports 15 on only one side thereof, it is to be noted that the platform 36 may include openings under the manifolds 12 to allow the use of manifolds having inlet ports on both sides thereof.

Figure 7:
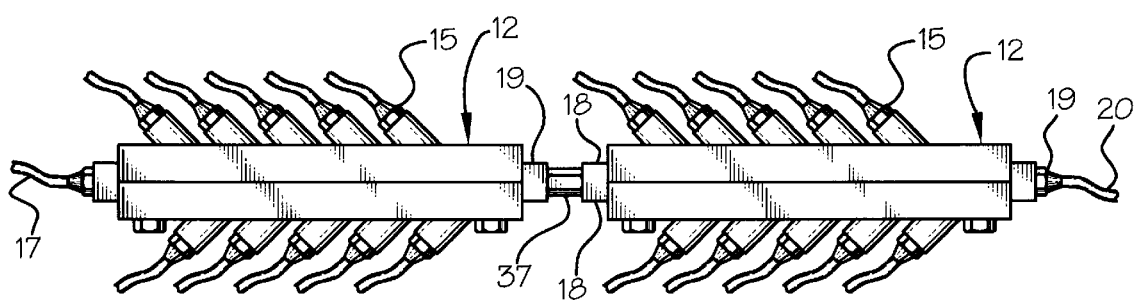

FIG. 7 illustrates the use of two manifolds 12 end to end or axially aligned with each other and joined together by an appropriate connector 37 which attaches to the outlet port 19 of one manifold 12 and to the inlet port 18 of the downstream manifold 12. Obviously then, the manifold 12 provided by the present invention allows for many and varied ganging and tandem arrangements of the manifolds 12.

For purposes of further explaining and describing the present invention, a simple example follows. An arrangement is chosen where one manifold 12 is connected to a pluralty of screw feed machines 11. Each of the screw feed machines 11 contain a different sized fastener 16. A suitable prior art electronic apparatus, such as a computer, is comonally connected to the air supply, each of the screw feed machines 11 and to the fastening tool 21. The computer is programmed to select the proper sized fasteners in a propr sequence so that the proper sized fastener is available to be used at a particular location and in the proper sequence. Upon triggering of the fastening tool 21, the computer directs the correct screw feed machine 11 to feed a fastener of a particular size into the blow feed tube and into an inlet port 15 of the manifold 12. The air supply is activated to blow the fastener through the flow channel 26 while the impact insert orients the fastener 16 with the flow channel 26. The fastener is then fed into the blow delivery tube 20 and to the fastening tool 21. The tool operator then applies the selected fastener 16 to its preselected location. The computer then repeats this sequence while selecting the appropriate sized fastener 16 which is to be used at the next location on the work piece 22. The cycle again continues until the particular assembly operation is completed. In accordance with the present day computer technology, it is readily apparent that any conceivable sequence of different sized or even types of fasteners may be programmed to be delivered to the fastening tool 21. However, it is the inventive manifold 12 of the present invention which makes the programmed operation possible.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. A manifold adapted to be connected between one or more automatic screw-feeding machines and a fastening tool, said manifold comprising an elongated member having a flow path through the length thereof, a plurality of inlet ports each arranged at an acute angle to said flow path through said manifold, said inlet ports being flow connected to said flow path through said manifold.

2. The apparatus of claim 1, wherein said elongated member comprises two side-by-side members removably attached to each other.

3. The apparatus of claim 1, wherein said manifold includes an air inlet at one end thereof and a fastener exit at an opposite end thereof.

4. The apparatus of claim 1, wherein said inlet ports are each arranged along one side of said manifold.

5. The apparatus of claim 1, wherein said inlet ports are each arranged along two sides of said manifold.

6. The apparatus of claim 1 wherein two or more of said screw feeding machines contain different sized fasteners.

7. The apparatus of claim 1, wherein said manifold includes a plurality of impact members each arranged along the length of said flow path through said manifold at a location opposite to an exit for said flow paths through said inlet ports.

8. The apparatus of claim 7, wherein each of said impact members include a curved and indented surface along the length of said flow path through said manifold.

9. An automatic screw feeding machine arrangement comprising, a plurality of automatic screw feeding machines, each having a plurality of fasteners therewithin, each outputting a single fastener at any one time through an outlet, a manifold connected to said outlets said manifold comprising a plurality of inlet parts attached to one or more sides of said manifold, and a flow channel through said manifold, each of said inlet parts being flow connected to said flow channel through said manifold, an air delivery means for moving one of said fasteners from the outlet of any one of said screw feeding machines into said manifold, through said manifold and out of said manifold, and whereby a single fastener is output from said one or said screw feeding machines, into, through and out of said manifold before a subsequent fastener is input to said manifold.

10. The apparatus of claim 9 wherein two or more of said screw feeding machines contain different sized fasteners.

11. The apparatus of claim 9, wherein said manifold further comprises said inlet ports being arranged at an acute angle relative to said flow channel through said manifold.

12. The apparatus of claim 11, wherein said manifold further comprises a plurality of impact members arranged along the length of said flow channel at a location opposite to an exit of a flow path through said inlet ports.

13. The apparatus of claim 9, wherein said delivery means comprises a flow channel through said manifold, an inlet port attached to said manifold and flow connected to said flow channel.

14. The apparatus of claim 13, including a pressurized air source connected to one end of said flow channel through said manifold.

15. The apparatus of claim 13, including a delivery tube connected to an outlet end of said flow channel through said manifold.

* * * * *